June 15, 1965 J. T. MULLIN 3,189,683

TRANSDUCING SYSTEM FOR PHOTOGRAPHICALLY RECORDING VIDEO IMAGES AND SOUND SIGNALS RELATED THERETO

Filed Dec. 9, 1960 3 Sheets-Sheet 1

INVENTOR:
John T. Mullin
By Smyth, Roston & Pavitt
Attorneys.

June 15, 1965 J. T. MULLIN 3,189,683

TRANSDUCING SYSTEM FOR PHOTOGRAPHICALLY RECORDING VIDEO IMAGES AND SOUND SIGNALS RELATED THERETO

Filed Dec. 9, 1960

3 Sheets-Sheet 2

INVENTOR:
John T. Mullin
By Smyth, Roston & Pavitt
Attorneys.

INVENTOR.
John T. Mullin
By Smyth, Roston & Pavitt
Attorneys.

United States Patent Office 3,189,683
Patented June 15, 1965

3,189,683
TRANSDUCING SYSTEM FOR PHOTOGRAPHICALLY RECORDING VIDEO IMAGES AND SOUND SIGNALS RELATED THERETO

John T. Mullin, Beverly Hills, Calif., assignor to Minnesota Mining and Manufacturing Company, St. Paul, Minn., a corporation of Delaware
Filed Dec. 9, 1960, Ser. No. 75,464
13 Claims. (Cl. 178—5.6)

This invention relates to recording and reproducing systems and, more particularly, to such systems capable of recording and reproducing signals over a wide frequency range such as, for example, video signals.

Conventional apparatus for recording video information includes either magnetic tape equipment or photographic equipment. At first, photographic equipment was utilized even though it had many disadvantages because the tape equipment was limited at reasonable tape speeds with respect to its usable frequency range. The video image was recorded as successive frames in accordance with conventional motion film techniques. Magnetic tape recording equipment has, however, been developed for transversely recording and reproducing signals covering a relatively wide frequency range across a magnetic tape. This transverse recording equipment is in the main equipment currently utilized for recording video information.

One such transverse recording equipment utilizes a rotary magnetic head assembly provided with magnetic units arranged to sweep successively across a relatively wide magnetic tape. While such equipment is workable, it is subject to a number of important disadvantages. For example, while a fineness of detail can be recorded and reproduced in the the direction of the rotation of the high speed magnetic heads, detail in the direction of motion of the tape is very poor. The detail is poor because of the finite width of the head structure and because the successive transverse tracks must be separated by a few thousandths of an inch to avoid crosstalk between tracks. Another disadvantage is that the high speed rotating heads must be very accurately controlled by high grade servo systems to maintain synchronization and low flutter. Further, editing of the tape is difficult because the operator cannot view the picture by inspecting the surface of the tape. Still another important disadvantage is that the sound accompanying the video image is linearly displaced from the recorded video information and not synchronized with the transverse tracks. This latter disadvantage further complicates the procedure of editing.

In a specific illustrative embodiment of this invention, these disadvantages are overcome utilizing a transverse recording and reproducing system capable of handling high grade picture information accompanied by high fidelity sound. In the specific illustrative embodiment, high speed mechanical devices are not utilized and instead high speed electronic devices are provided, such as cathode ray tubes and flying spot scanners. The recording apparatus may include two cathode ray tubes: a cathode ray tube for recording the video signals, and a cathode ray tube for recording the audio signals. The two cathode ray tubes are both associated with a strip of continuously moving film which may function as the recording medium.

The video signals to be recorded may be of the type conventional in the United States comprising a succession of horizontal line scans. The video signals are frequency modulated on a carrier and the modulated carrier is first rectangularized and then introduced to the cathode ray tube for recording. Vertical deflection is not required because of the continuous movement of the film strip adjacent the two cathode ray tubes. Gamma and gray scale problems usually associated with film are nonexistent because there are only two states of the cathode ray tube current, on and off. Only two states of current are provided because the modulated carrier is rectangularized before it is introduced to the video cathode ray tube. A typical recorded line of the video information, on examination under a microscope, consists of a series of alternate dark and light dashes, the duration of which changes with the video information.

Features of this invention pertain to means for providing visible images at the film which is readily viewable by an observer. The images are substantially the same as the successive images represented by the input video signals. The frequency modulation of the video signals is such that the lighter portions of the images represented by the video signals provide for lower frequencies and the darker portions for higher frequencies. The successive lines on the film are recorded quite close together and the observer can view and edit the recorded picture quite readily by providing light at an angle to the grating formed by the alternate dark and light dashes of the lines. The resultant interference pattern provides for an image where the closely spaced dots in each line blend together. Since these spots represent the dark portions of the original image represented by the video signals, a picture of substantially the same as the original image is provided to the observer.

Further features of this invention relate to the provision of means for recording the sound information accompanying the video information in direct line by line synchronization with the transverse lines recorded across the moving film. The audio cathode ray tube, mentioned above, is utilized for transversely recording the sound, and is driven in synchronization with the cathode ray tube for the video signals. Means are provided for sampling the audio signals and for converting the audio signals to pulse duration signals. The pulse duration signals are transversely recorded across part of the film strip and the video modulated carrier is recorded across another part of the film strip. Effectively, a recorded line extending across the film strip incluudes two parts: a first part for the sound information which is recorded by the audio cathode ray tube, and a second part for the video information which is recorded by the video cathode ray tube. The duration of the pulses derived from the sound information determines the length of a recorded line in the first part for each of the transverse lines across the film strip. The successive lines for the sound information on the film strip would appear upon a casual inspection to form a variable area sound track.

The maximum frequency of the sound recordable in this manner is limited by the repetition rate of the transverse lines across the film strip utilized to record the successive pulse duration signals. The sampling rate of the audio signals, however, may be increased by a predetermined ratio and a number of successive sound lines or group of such lines may be recorded across the audio part of the film strip for each video line across the video part of the film strip. The first of each group of sound lines may be initiated simultaneously with the video line so as to be directly in line with the video line. High fidelity sound information may, accordingly be recorded which is in direct synchronization, line by line, with the video transverse line recording.

A pair of flying spot scanners may be utilized for reproducing the video and sound information recorded on a film strip. Separate photocell means are positioned relative to the film strip for receiving respectively the video and the audio or sound information illuminated by the pair of flying spot scanners. Thus, line by line, the video signals are reproduced at the video photocell means as one spot sweeps across the film, and at the same time the sound, in the form of variable pulse signals, is developed at the audio photocell means as the other spot sweeps across the film. Means are provided for converting the pulse duration pulses to amplitude modulation pulses and for integrating the amplitude modulated pulses to provide a varying signal which is the same as the original audio signal provided for recording.

Further features of this invention pertain to the provision of noise reduction means for avoiding noise due to the presence of dirt on the film strip. Means are provided for controlling the flying spot scanner for the audio signals to initiate each trace or line scan at an opaque portion on the film strip. Each pulse on the film strip may be opaque or dark, and the trace starts just after the beginning of the recorded pulse. A pulse is developed by the associated photocell means at a time position when the scanning spot reaches the transparent portion of the film following the recorded pulse. Dirt either on the opaque recorded pulse or on the transparent portion following the pulse does not affect the accuracy of the reproduction or introduce any noise.

Further advantages and features of this invention will become apparent upon consideration of the following description when read in conjunction with the drawing wherein.

Figure 1:
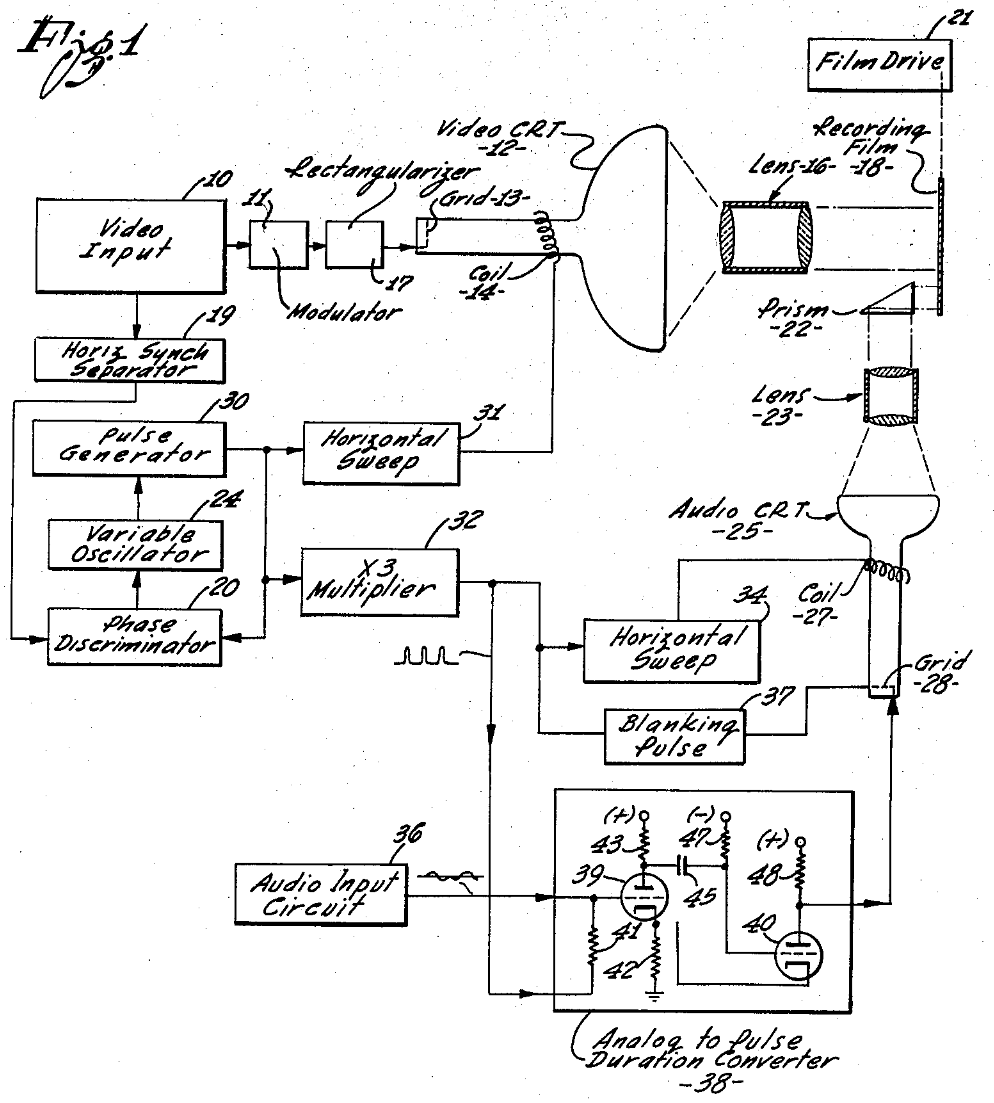
FIGURE 1 is a functional representation of the recording apparatus of the recording and reproducing system of this invention.

Referring first to FIGURE 1, which shows the reproducing apparatus of this invention, the signals to be recorded may be conventional video signals provided by a video input circuit 10, and high fidelity audio signals accompanying the video signals are provided from an audio input circuit 36. The conventional television signal in the United States includes 525 horizontal lines at a repetition rate of 15,750 lines per second for each frame. The repetition rate of the frames is 30 frames per second, with each frame representing a separate image or scene. The video signals may also include horizontal and vertical synchronization and blanking pulses.

The video signals are introduced from the circuit 10 to a frequency modulator 11 for frequency modulating a carrier. The carrier may have a frequency of approximately 5 megacycles which is suitable for modulation by the wide band television signals. The modulation is such that the video signals representing lighter portions of the images or scenes provide for lower frequencies, and the darker portions provide for higher frequencies. As is hereinafter described, this direction of modulation is an important feature in the apparatus for viewing and editing the recorded frames. The frequency modulated signal from the modulator 11 is introduced to a circuit 17 which rectangularizes the individual pulses of the frequency modulated carrier. Illustratively, the circuit 17 may be a Schmitt trigger circuit which operates in one direction when the carrier increases to a predetermined value and which operates in the other direction when the carrier decreases to a predetermined value. The circuit 17 may also be an overdriven amplifier which rectangularizes the frequency modulated signal. The output of the circuit 17, accordingly, is a series of rectangular or flat top pulses having a duration which varies in accordance with the video signals from the input circuit 10.

The rectangularized frequency modulated carrier from the circuit 17 is introduced to the grid 13 of a video cathode ray tube 12. The cathode ray tube 12 is one of two cathode ray tubes 12 and 25 utilized in the recording apparatus of this invention. The tube 12 is utilized to record the video signals and the tube 25 is used to record the high fidelity audio signals from the circuit 36. The signal to the grid 13 of the cathode ray tube consists of a series of pulses of varying lengths depending upon the frequency modulation or the video information. The beam in the cathode ray tube 12 is, therefore turned on and off in accordance with the successive pulses from the circuit 17.

The horizontal movement of the beam in the cathode ray tube 12 is synchronized with the video signals provided from the input circuit 10 so that a horizontal line of the cathode ray tube 12 is initiated at the beginning of a horizontal line of the video signals. A conventional type horizontal sync pulse separator 19 may be utilized to separate the horizontal synchronizing pulses of the video input signals from the circuit 10. The horizontal synchronizing pulses are provided from the separator 19 to a phase discriminator 20 which compares the phase of these pulses with the phase of pulses provided from a pulse generator 30. Any difference in phase between the two sets of pulses provides for an error signal at the output of the phase discriminator 20 which is introduced to a variable oscillator 24. The oscillator 24 may include a reactance tube, not shown, or other means for varying the frequency of the oscillator in accordance with the error signal from the phase discriminator. The frequency of the oscillator 24, accordingly, varies in accordance with the error signal provided thereto so as to be directly in step with the horizontal synchronizing pulses of the video signals. The signal from the oscillator 24 is provided to the pulse generator 30 so that the pulse generator 30 is driven in step and in phase with the horizontal synchronizing pulses of the video input signal.

The pulses from the pulse generator 30 are provided to a horizontal sweep circuit 31 which controls the deflection of the beam across the face of the tube 12. Vertical deflection is unnecessary because the image on the face of the cathode ray tube 12 is provided through a lens system 16 to a moving strip of recording film 18. The film 18 may be driven by a conventional film drive 21 to move at a relatively constant velocity so that line after line of the video signals are recorded on the film due to its own motion. The speed of the film 18 determines the spacing between the successive horizontal video lines. The lines are recorded transversely across the film strip in a direction substantially perpendicular to its direction of motion.

The present invention is not restricted to photographic recording techniques as for example thermoplastic recording techniques may be utilized for recording the video and audio signals. When thermoplastic recording is provided, an electron beam in a flying spot scanner is used instead of a cathode ray tube as the transducing or recording means. The specific photograph illustrative embodiment is accordingly merely illustrative.

At the same time that the video information is being recorded line by line transversely across the film strip 18, the audio input information from the circuit 36 is also recorded on the film strip 18. The input audio signal from the circuit 36 is provided to an analog-to-pulse duration converter 38. The converter 38 successively samples the audio signal and provides a succession of pulses varying in duration in accordance with the instantaneous magnitudes of the audio signal. The sampling input rate of the audio signals may be a multiple of the repetition rate of the transverse lines across the film 18. The horizontal line repetition rate of the conventional video signal is 15,750 lines per second. Utilizing a sampling rate system of the type described herein, frequencies equal to approximately one third the sampling rate may be recorded. If the sampling rate, accordingly, is 15,750 cycles per second, the upper recordable frequency of the sound is approximately 5,250 cycles per second. For high fidelity recording, frequencies above these frequencies are, however, required. The sampling rate of the converter 38 is, accordingly, higher than the line repetition rate of the video signals. Illustratively, the sampling rate may be three times the video line repetition rate to provide for recording sound frequencies up to about 15 kc.

The pulse generator 30, described above, provides the pulses at a repetition rate of 15,750 pulses per second to a frequency multiplier 32 as well as to the sweep circuit 31. The output of the multiplier 32 may be a series of pulses at a repetition rate of three times 15,750 pulses per second which is 47,250 pulses per second. These pulses from the multiplier 32 are synchronized with the input video signal because the pulse generator 30 is synchronized therewith. The pulses from the multiplier 32 are utilized to operate a horizontal sweep circuit 34 and a blanking pulse generator 37 associated with the audio cathode ray tube 25. The pulses from the multiplier 32 are also introduced to the converter 38 for successively sampling the audio input signals. The audio input signals are, accordingly, sampled at a rate of 47,250 times per second and the audio cathode ray tube 25 is operated at a line scanning rate of 47,250 lines per second.

Any conventional type of analog-to-pulse duration converter may be utilized for converting the analog audio signals to pulse duration signals. One such converter is depicted in detail in FIGURE 1. The sampling pulses are provided through a resistor 41 to the control grid of a triode 39 in the converter 38. A varying bias potential is provided to the control grid of the tube 39 from the audio input circuit 36, but the magnitude of the successive pulses from the multiplier 32 is constant. The signal at the control grid, accordingly, represents the sum of the magnitude of the sampling pulse and the instantaneous magnitude of the audio input signal. The signal at the control grid of the triode 39 varies the conductivity of the triode and accordingly the potential at its anode. The tube 39 is conductive over a path from a positive potential source through a plate resistor 43, the triode 39 and a cathode resistor 42 to ground. Between pulses from the multiplier 32, the potential at the anode of the tube 39 is determined by the instantaneous magnitude of the audio input signal. The potential at the anode controls the discharge time of a capacitor 45 connected between the anode of the triode 39 and the control grid of a triode 40 so that the triode 40 becomes conductive at a time determined by the instantaneous magnitude of the audio input signal. The control grid of the triode 40 is biased from a negative potential source through a resistor 47 so that the triode 40 remains non-conductive when only the audio signals are introduced to the control grid of the triode 34. The cathode of the triode 40 is connected to the cathode resistor 42, and its anode is biased through a resistor 48 connected to a positive potential source. Responsive to each pulse from the multiplier 32, a pulse is developed by the converter 38 initiating at a time determined by the magnitude of the audio input signal. The nagative pulse from the converter 38 may be utilized for blanking the beam in the cathode ray tube 25.

Figure 3:
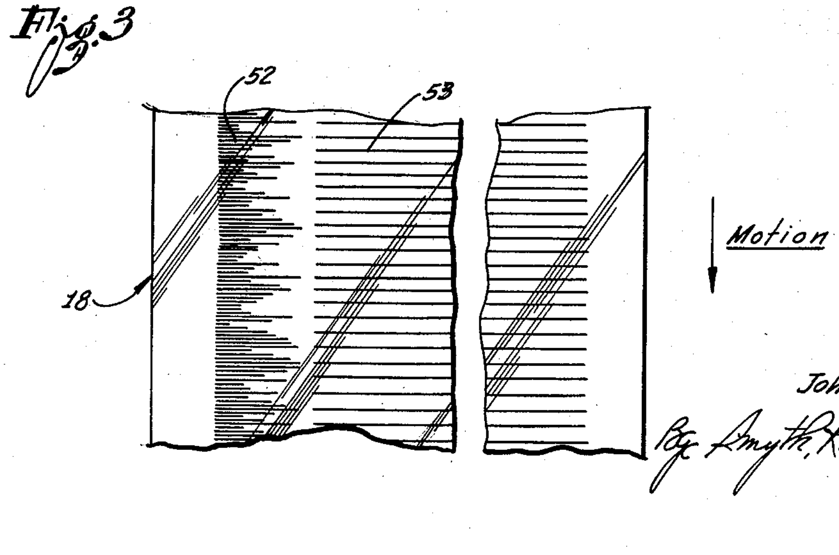
FIGURE 3 is a fragmentary view of the film strip utilized in the recording and reproducing system of this invention illustrating the disposition and synchronization of the recorded sound and video signals.

Referring now to FIGURE 3, the successive audio lines 52 on the film strip 18 are each initiated and then are terminated by the converter 38 at a point determined by the audio signals. The film strip 18 may be capstan or sprocket driven at a constant speed adjacent the tubes 12 and 25. The film strip 18 includes the audio recorded lines 52 and the video recorded lines 53 shown arranged along two longitudinal or lengthwise areas of the strip 18. Three audio recorder lines 52 are provided for each of the video recorded lines 53. The first of each three audio lines 52 may be directly in alignment with the associated video line 53. Depending upon the polarity of the pulses introduced to the tube 25, and whether a positive or negative is made from the film strip, one portion or the other of the transverse line across the audio portion of the strip 18 may be dark and the other light. The video portion and each line 53 consists of many dark and light dashes of varying lengths depending upon the video information.

Figure 4:
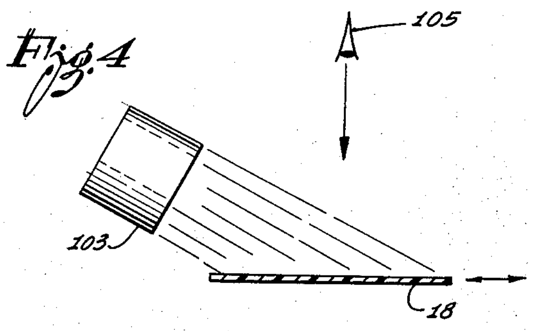
FIGURE 4 is a diagrammatic representation of apparatus for viewing the successively recorded images on the film strip.
Figure 5:
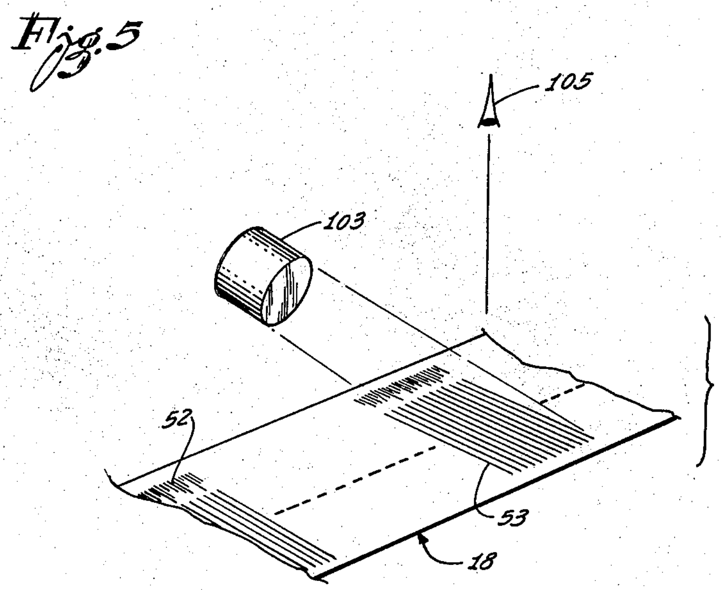
FIGURE 5 is a pictorial view of the apparatus for viewing the successively recorded images on the film strip.

In FIGURE 3, the longitudinal spacing of the lines 52 and 53 is exaggerated as they would be much closer together and seeming to blend one into another to an observer. For example, if the width of each track or line 53 is .75 inch, the 262.5 lines forming a video field may occupy $\frac{3}{4} \times .75 = \frac{9}{16}$ inch or have a density of approximately 466 lines per inch. The lines 53, accordingly, form a diffraction grating of light and dark dashes of varying lengths. The appearance of the frame is gray. However, when light is provided at an angle to the film strip 18, as depicted in FIGURES 4 and 5, the closely spaced successive dots in each line 53 seem to blend together due to the interference patterns formed by the grating. As described above, the closely spaced dots represent darker portions of the scene represented by the input video signals. In FIGURES 4 and 5, light is provided from a source 103, and the lines 53 are aligned in the direction of the arrow at the right of the strip 18 in FIGURE 4. When viewed in this manner, interference patterns result in effectively blending the closely spaced dots in each line 53 as a contiguous dark mass. In this manner, the portions of each line 53 representing darker portions actually appears darker so that the resulting image to an observer at position 105 is essentially the same as the original scene from which the input video signals were produced. This image may be projected and enlarged for easier viewing.

Figure 2:
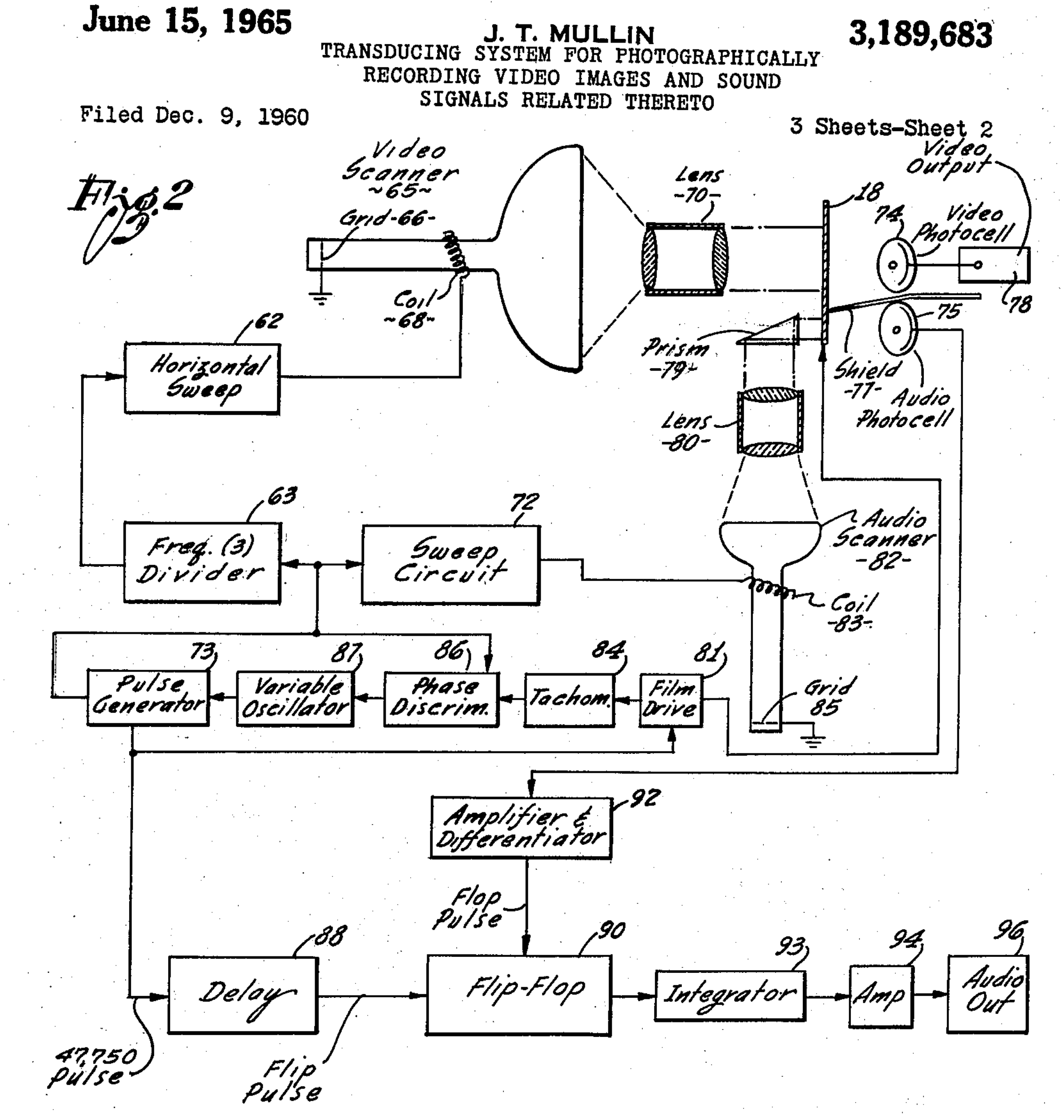
FIGURE 2 is a functional representation of the reproducing apparatus of the recording and reproducing system of this invention.

The successive frames of the video signals are recorded on the film strip 18, field by field, with a separation between the recorded video singals due to the vertical blanking interval in the signals between successive fields. The video and audio information may be reproduced from the film strip 18 by the apparatus depicted in FIGURE 2. As shown in FIGURE 2, two flying spot scanners 65 and 82 are utilized for reproducing respectively the video and the audio signals from the strip 18. The flying spot scanner 65 and the flying spot scanner 82 are both synchronized with the movement of the film strip 18. The motor or film drive 81 drives a tachometer 84 which may include multiplying means, not shown. The output of the tachometer 84 is a series of pulses having a repetition rate or frequency which varies with the speed of the motor 81. The nominal repetition rate may be 47,250 cycles per second.

The succesive pulses from the tachometer 84 are introduced as one input to a phase discriminator 86. The other input is provided from the pulse generator 73 having a nominal repetition rate of 47,750 pulses per second. The difference in phase between the pulses from the generator 73 and between the differentiated pulses from the tachometer 84 causes the discriminator 86 to develop an error signal in accordance therewith. The error signal from the discriminator 86 is introduced to a variable oscillator 87 which controls the instantaneous repetition rate of the pulse generator 73. The pulse generator 73 is, in this manner, sychronized with the movement of the film strip 18.

The pulses from the pulse generator 73 are introduced to a sweep circuit 72 for controlling the horizontal line frequency of the audio scanner 82. The sweep signals from the circuit 72 are provided to a deflection coil 83 of the audio scanner 82. The control grid 85 of the scanner 82 may be grounded. The pulses from the generator 73 are also introduced to a frequency divider 63 which provides pulses at a nominal repetition rate of 15,750 pulses per second. The frequency division is, accordingly, by a factor of 3. The pulses from the frequency divider 63 are introduced to a horizontal sweep circuit 62 for controlling the deflection of the video scanner 65. Sweep signals from the circuit 62 are provided to a deflection coil 68 of the video scanner 65. The control grid 66 of the video scanner 65 may be grounded. The two scanners 65 and 82 are, in this manner, operated in synchronism with the signals recorded on the film strip 18, with the scanner 82 being operated at a line scanning rate three times that of the scanner 65. The beams in the scanner 65 are blanked during the retrace time so that signals are not developed at the photocells 74 and 75 at such times. The signals from the film strip 18 are simultaneously received at the photocells 74 and 75 from the two different longitudinal areas of the film strip 18. More particularly, the signals from the video lines 53 are received at the photocell 74, and the signals from the audio lines 52 are received at the audio photocells 75. The two photocells 74 and 75 may be separated by a light shield 77.

The signals from the audio photocell 75 are pulse signals with each pulse beginning at a time position indicative of the instantaneous magnitude of the original audio signals. The successive line scans are initiated in the opaque parts of the successive lines 52 so that the reproduced pulses are first initiated at the beginning of the light or transparent part of the lines 52 following the opaque parts. The pulses from the generator 73 are utilized for recovering the audio signals from the film strip 18. The flying spot scanner 82 scans the portion of the film strip 18 which includes the audio recorded lines 52 by means of a lens system 80 and a prism 79. The output of the photocell 75 is, accordingly, a series of pulses initiated at the light portions of the successive audio lines 52. The signals from the photocell 75 are provided to an amplifier and differentiating circuit 92 which provides a series of positive pulses for resetting a flip-flop circuit 90. The flip-flop circuit 90 is set by a delay circuit 88 controlled by the pulse generator 73. The flip-flop circuit 90 is, accordingly, set periodically at a substantially fixed time epoch but is reset at a time position varying in accordance with the audio information reproduced from the film strip 18. The flip-flop circuit 90, accordingly, produces varying duration pulses in accordance with the audio input signals.

The varying duration pulses from the flip-flop circuit 90 are provided to an integrator circuit 93 which develops a smooth varying signal which is essentially similar to the input audio signal. The signal from the integrator circuit 93 is amplified by an amplifier 94 and the amplified signal is provided to an audio output circuit 96. At the same time that the audio signals are received at the circuit 96, the video signals are received at an output circuit 78. The circuit 78 may include demodulating means for recovering the video signals from the frequency modulated carrier.

The reproduction system is effective as a noise suppressing system with respect to noise from any dirt or dust on the film strip 18. As described above, the scanner 82 initiates its trace or line scan after the beginning of a line 52 on the strip 18 which is upon an opaque portion of the strip 18. The flip-flop circuit 90 is reset at a time position when the scanner 82 reaches the transparent portion of the strip 18 at the end of the respective line 52. The flip-flop circuit 90 then remains reset and any dirt on the transparent portion does not set it or affect the time it is reset. Similarly, any dust or dirt on a line 52 does not cause the circuit 90 to reset and, accordingly, does not affect the reproducing accuracy or introduce a noise component.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A system for recording both primary signals having a relatively wide frequency band and auxiliary signals having a relatively narrow frequency band and being synchronized with the primary signals where the system is used with a movable recording medium, the system including: means operatively coupled to the medium for obtaining a movement of the medium, first line scanning means for recording the primary signals as a series of tracks partially across the movable recording medium in a direction transverse to the direction of movement of the recording medium and for obtaining such recording during the movement of the medium, means for sampling the auxiliary signals at a repetition rate related to the line repetition rate of said first line scanning means, and second line scanning means synchronized with said first line scanning means for recording the sampled auxiliary signals as a series of tracks partially across the movable recording medium in a direction aligned with the direction of the tracks recorded by said first line scanning means and for obtaining such recording during the movement of the medium whereby the primary signals are recorded in a first portion of the recording medium aligned in the direction of its movement and the auxiliary signals are recorded in a second such portion.

2. A system for recording on a movable recording medium both a line-scan video signal and a continuously variable audio signal associated with the video signal where the movable recording medium has a first and a second recording area aligned along the medium in the direction of its motion, including, means operatively coupled to the medium for obtaining a movement of the medium, means positioned relative to the recording medium for recording the line-scan video signal in the first recording area in a series of transverse tracks extending across the first recording area and for recording the line-scan video signals during the movement of the medium, means synchronized with said recording means for sampling the audio signal to provide for a series of pulses having duration representing instantaneous values of the audio signals, and means synchronized with the recording means and coupled to said sampling means for recording the pulses from said sampling means in a series of transverse tracks substantially parallel to the first transverse tracks and extending across the second recording area of the recording medium and for recording the pulses from the sampling means during the movement of the medium.

3. A system for recording on a movable recording medium both primary signals having a relatively wide frequency band and auxiliary signals having a relatively narrow frequency band and being synchronized with the primary signals, including, means operatively coupled to the medium for obtaining a movement of the medium, first line scanning means for recording the primary signals as a series of tracks partially across the moving recording medium in a direction transverse to the direction of movement of the recording medium and for recording the primary signals during the movement of the medium, means for converting the auxiliary signals to pulse duration signals at a repetition rate related to the line repetition rate of said first line scanning means, and second line scanning means synchronized with said first line scanning means for recording the sampled auxiliary signals as a series of tracks partially across the moving recording medium in a direction aligned with the direction of the tracks recorded by said first line scanning means and for recording the sampled auxiliary signals during the movement of the medium whereby the primary signals are recorded in a first portion of the recording medium aligned in the direction of its movement and the auxiliary signals are recorded in a second such portion.

4. A recording and reproducing system for a line-scan video signal and a continuously variable audio signal associated with the video signal where the system is used within a movable recording medium having a first and a second recording area aligned along the medium in the direction of its motion, the system including, means operatively coupled to the medium for obtaining a movement of the medium, means positioned relative to the recording medium for recording the line-scan video signal in the first recording area in a series of transverse tracks extending across the first recording area, means synchronized with said recording means for sampling the audio signal to provide for series of pulses representing the instantaneous values of the audio signals, means synchronized with the recording means and coupled to said sampling means for recording the pulses from said sampling means in a series of transverse tracks extending across the second recording area of the recording medium, means synchronized with the movement of the recording medium for reproducing the video signal recorded in the first area of the recording medium, means synchronized with the movement of the recording medium for reproducing the pulses recorded in the second area of the recording medium, and means coupled to said second mentioned reproducing means for converting the reproduced pulses to a continuously variable signal substantially similar to the audio signal associated with the video signal.

5. A recording system for both line-scan signals and continuous signals synchronized with the line-scan signals where the system is used with a recording medium having a first and a second recording area, the system including, means operatively coupled to the medium for obtaining a movement of the medium, means positioned relative to the first area of the recording medium for recording the line-scan signals as a series of tracks on the first area in a direction transverse to the direction of movement of the medium and for recording the line-scan signals during the movement of the medium, means for successively sampling the continuous signals to provide a series of sampled pulses, and means coupled to said sampling means and positioned relative to the second area of the recording medium for recording the sampled pulses as a series of tracks in the transverse direction on the second area and for recording the sampled pulses during the movement of the medium.

6. A reproducing system for use with a moving recording medium having a first recording area upon which are recorded successive transverse tracks representing line-scan wide-band signals and further having a second recording area upon which are recorded successive transverse tracks aligned with the tracks of said first area where the successive transverse tracks have durations representing the instantaneous amplitudes of an audio signal at progressive instants of time, the system including: means for moving said recording medium, first scanning means positioned relative to the first area for reproducing the signals recorded in the successive transverse tracks of the first area and for reproducing such signals during the movement of the medium; second scanning means positioned relative to the second area for reproducing the signals recorded in the successive transverse tracks of the second area and for reproducing such signals during the movement of the medium, and means coupled to the second scanning means for converting the durations of the successive reproduced signals from the second scanning means to a continuously variable signal having an amplitude representing such durations to reconstitute the amplitude of the audio signal.

7. A system for reproducing line-scan signals recorded as successive transverse tracks partially across a movable recording medium and also pulse duration signals recorded as successive transverse tracks partially across the movable recording medium, where the number of transverse tracks in the second area is greater by an integer factor than the number of transverse tracks in the first area, the system including: means for moving said recording medium, first scanning means positioned relative to the first area for reproducing the signals recorded in the successive transverse tracks of the first area; second scanning means positioned relative to the second area for reproducing the signals recorded in the successive transverse tracks of the second area, and means coupled to the second scanning means for converting the successive reproduced signals from the second scanning means to a continuous varying signal representing the audio signals.

9. A recording and reproducing system for both line-scan signals and continuous signals synchronized with the line-scan signals where the system is used with a recording medium having a first and a second recording area, the system including: means positioned relative to the first area of the recording medium for recording the line-scan signals as a series of tracks on the first area, means for successively sampling the continuous signals to provide a series of sampled pulses, means coupled to said sampling means and positioned relative to the second area of the recording medium for recording the sampled pulses as a series of tracks on the second area, means for moving said recording medium, first scanning means positioned relative to the first area for reproducing the signals recorded in the successive transverse tracks of the first area; second scanning means positioned relative to the second area for reproducing the signals recorded in the successive transverse tracks of the second area, and means coupled to the second scanning means for converting the successive reproduced signals from the second scanning means to a continuous varying signal representing the audio signals.

9. A recording and reproducing system in accordance with claim 8 wherein each of said first and said second scanning means and said converting means are synchronized with the moving recording medium.

10. A system for recording both primary signals having a relatively wide frequency band and auxiliary signals having a relatively narrow frequency band and being synchronized with the primary signals where the system is used with a movable recording medium, the system including: means operatively coupled to the recording medium for obtaining a movement of the medium, a source of carrier frequency means coupled to the source for frequency modulating the primary signals on the carrier frequency, means coupled to the modulating means for rectangularizing the frequency modulated signals from said modulating means to provide a series of pulses varying in duration in accordance with primary signals, first line scanning means coupled to said rectangularizing means for recording the series of pulses in a succession of transverse tracks partially across the moving recording medium in a direction transverse to the direction of movement of the recording medium, means for converting the auxiliary signals to pulse duration signals at a repetition rate related to the line repetition rate of said first line scanning means, and second line scanning means synchronized with said first line scanning means for recording the sampled auxiliary signals as a series of tracks partially across the moving recording medium in a direction aligned with the direction of the tracks recorded by said first line scanning means whereby the primary signals are recorded in a first portion of the recording medium aligned in the direction of its movement and the auxiliary signals are recorded in a second such portion.

11. A system for recording on a movable recording medium both a line-scan video signal and a continuously variable audio signal associated with the video signal where the movable recording medium has first and second recording areas aligned along the medium in the direction of its motion, the system including, means operatively coupled to the medium for obtaining a movement of the medium, means positioned relative to the recording medium for recording the line-scan video signal in the first recording area in a series of transverse tracks extending across the first recording area, means synchronized with the recording means for sampling the audio signal to provide for a series of pulses representing instantaneous values of the audio signals, and means synchronized with the recording means and coupled to the sampling means for recording the pulses from the sampling means in a series of tracks extending across the second recording area of the recording medium, the repetition rate of the sampling means being greater by a particular ratio than the line repetition rate of the line-scan video signals.

12. A recording system for both line-scan signals and continuous signals synchronized with the line-scan signals where the system is used with a recording medium having first and second recording areas, the system including, means operatively coupled to the medium for obtaining a movement of the medium, means positioned relative to the first area of the recording medium for recording the line-scan signals as a series of tracks on the first area, means for successively sampling the continuous signals to provide a series of samples pulses, and means coupled to the sampling means and positioned relative to the second area of the recording medium for recording the sampled pulses as a series of tracks on the second area, the repetition rate of the sampling means being greater by a particular integer factor than the track repetition rate of the first mentioned recording means.

13. The recording system set forth in claim 12 including in addition means coupled to the first mentioned and to the second mentioned recording means for synchronizing the operation of the first mentioned and the second mentioned recording means with the line-scan signals, and means coupled to the sampling means for synchronizing the operation of the sampling means with the line repetition rate of the line-scan signals.

References Cited by the Examiner

UNITED STATES PATENTS

| | | | |
|---|---|---|---|
| 1,998,456 | 4/35 | Severy | 179—100.3 |
| 2,128,078 | 8/38 | Davis | 178—5.6 |
| 2,363,502 | 11/44 | Collins | 178—5.6 |
| 2,465,849 | 3/49 | Cooney | 179—110.3 |
| 2,681,382 | 6/54 | Hilburn | 178—6.7 |
| 2,769,028 | 10/56 | Webb | 178—5.4 |
| 2,839,602 | 6/58 | Fries | 178—6.7 |
| 2,952,737 | 9/60 | Friess | 178—5.6 |

FOREIGN PATENTS 83,175 3/21 Austria.

DAVID G. REDINBAUGH, *Primary Examiner.*

NEWTON N. LOVEWELL, *Examiner.*